United States Patent
Pain et al.

(10) Patent No.: US 7,746,383 B2
(45) Date of Patent: Jun. 29, 2010

(54) PHOTODIODE CMOS IMAGER WITH COLUMN-FEEDBACK SOFT-RESET FOR IMAGING UNDER ULTRA-LOW ILLUMINATION AND WITH HIGH DYNAMIC RANGE

(75) Inventors: Bedabrata Pain, Los Angeles, CA (US); Thomas J. Cunningham, Pasadena, CA (US); Bruce Hancock, Altadena, CA (US); Suresh Seshadri, Cerritos, CA (US); Monico Ortiz, Goleta, CA (US); Guang Yang, Annandale, NJ (US)

(73) Assignee: California Institute of Technology, Pasadena, CA (US)

( * ) Notice: Subject to any disclaimer, the term of this patent is extended or adjusted under 35 U.S.C. 154(b) by 972 days.

(21) Appl. No.: 10/779,144

(22) Filed: Feb. 12, 2004

(65) Prior Publication Data

US 2004/0169740 A1     Sep. 2, 2004

Related U.S. Application Data

(62) Division of application No. 10/008,568, filed on Nov. 16, 2001, now Pat. No. 7,019,345.

(60) Provisional application No. 60/249,864, filed on Nov. 16, 2000, provisional application No. 60/311,475, filed on Aug. 10, 2001.

(51) Int. Cl.
*H04N 5/225* (2006.01)
*H04N 5/217* (2006.01)
*H04N 3/14* (2006.01)
*H04N 5/335* (2006.01)

(52) U.S. Cl. .............. 348/216.1; 348/241; 348/308
(58) Field of Classification Search ................ 348/241, 348/216.1, 294–324; 257/290–292
See application file for complete search history.

(56) References Cited

U.S. PATENT DOCUMENTS

| 5,835,141 A * | 11/1998 | Ackland et al. ............. 348/308 |
| 6,424,375 B1 * | 7/2002 | Fowler ....................... 348/241 |
| 6,532,040 B1 * | 3/2003 | Kozlowski et al. .......... 348/241 |
| 6,535,247 B1 * | 3/2003 | Kozlowski et al. .......... 348/241 |
| 6,727,946 B1 * | 4/2004 | Zhao et al. ................... 348/308 |
| 7,133,074 B1 * | 11/2006 | Brehmer et al. ............. 348/308 |

* cited by examiner

*Primary Examiner*—Jason Chan
*Assistant Examiner*—Pritham Prabhakher
(74) *Attorney, Agent, or Firm*—Lyon & Harr, LLP; Richard T. Lyon

(57) ABSTRACT

The present invention provides a CMOS imager with a reset scheme, by which a CMOS imager generates a sub-kTC noise so that read noise does not depend on the sense node capacitance. By using a column feedback circuit, reset noise can be suppressed to a negligible amount so that photogate APS or CCD-like circuits can achieve noise performance to very efficient value. This scheme allows increasing sense node capacitance without increasing the noise and also achieves a large full-well value without sacrificing read noise performance. The feedback circuit in one of the embodiments of the present invention is located at the column side of the circuit. This design provides a minimal change to the pixel. As a result quantum efficiency or pixel size is not compromised. The present invention allows a CMOS imager to capture scene with high intra-scene contracts under low illumination with high dynamic range.

12 Claims, 7 Drawing Sheets

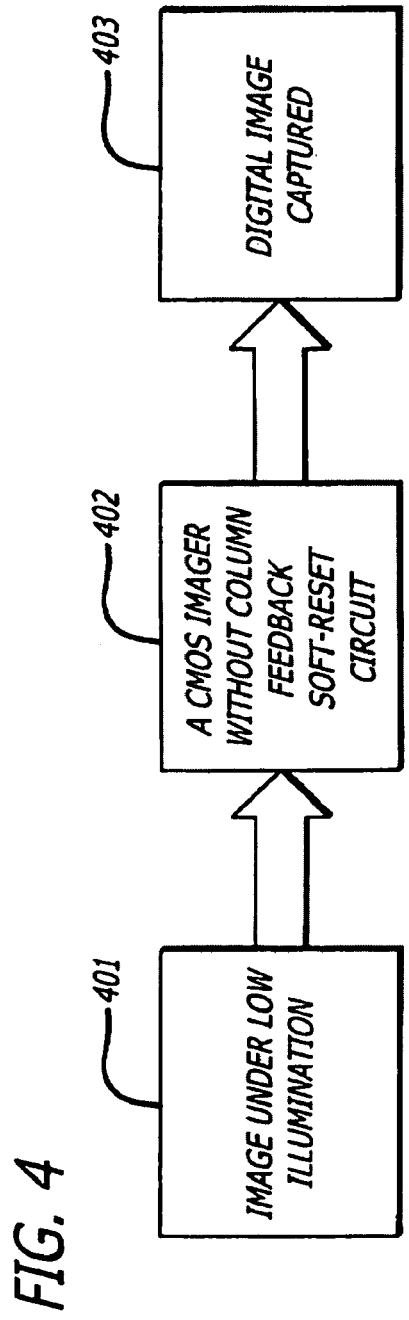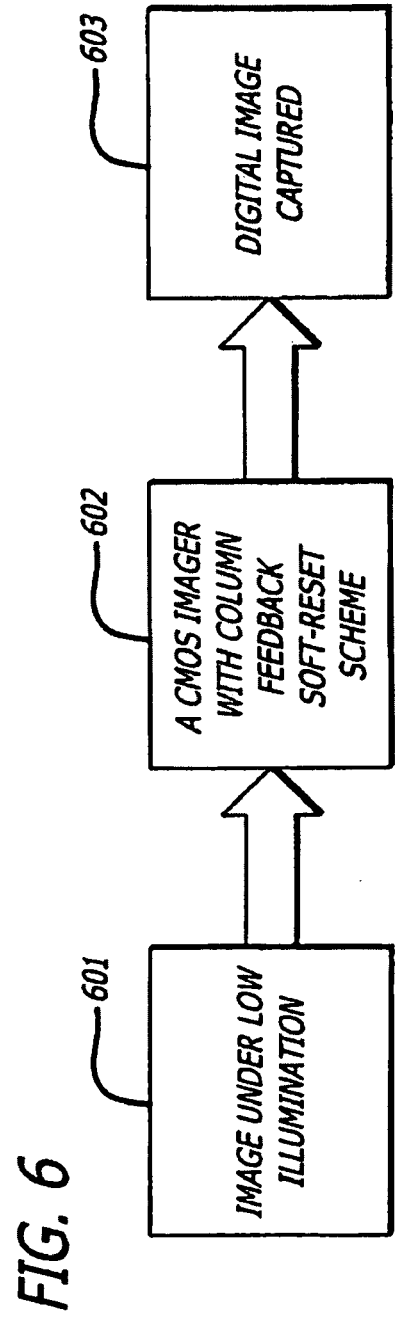
FIG. 4
FIG. 6

US 7,746,383 B2

PHOTODIODE CMOS IMAGER WITH COLUMN-FEEDBACK SOFT-RESET FOR IMAGING UNDER ULTRA-LOW ILLUMINATION AND WITH HIGH DYNAMIC RANGE

RELATED APPLICATION

This application is a divisional application of U.S. patent application Ser. No. 10/008,568, filed Nov. 16, 2001, now U.S. Pat. No. 7,019,345 which claims the benefit of U.S. Provisional Patent Application No. 60/249,864, filed on Nov. 16, 2000, and U.S. Provisional Patent Application No. 60/311,475, filed on Aug. 10, 2001, the disclosures of which are hereby incorporated by reference.

The invention described herein was made in the performance of work under a NASA contract and is subject to the provisions of Public Law 96-517 (35 U.S.C. 202) in which the Contractor has elected to retain the title.

BACKGROUND OF THE INVENTION

1. Field of the Invention

The present invention relates to the field of image sensing devices. More specifically, the present invention relates to a photodiode Complementary Metal Oxide Semi-Conductor (CMOS) imager with column-feedback soft-reset for imaging under ultra-low illumination and with high dynamic range.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Image sensors are devices capable of converting an image into a digital image. Image sensors are also referred as "silicon film" or "silicon eyes". These devices are made of silicon since silicon has the properties of both being sensitive to light in the visible spectrum and being able to have circuitry integrated on-board.

A CMOS imager is an image sensor made from silicon. CMOS imagers include an array of photo-sensitive diodes, one diode within each pixel. FIG. 1 illustrates a CMOS imager array. Each pixel 100 in a CMOS imager has a radiation sensitive element 110 with each radiation sensitive element connected to an amplifier 120. A CMOS pixel which converts an optical image into an electronic signal with an arrangement of having an amplifier attached to each radiation-sensitive element is called an "active pixel".

The active pixels in a CMOS imager can be arranged in a matrix form and be utilized to generate video signals for video cameras, still photography, or anywhere incident radiation needs to be quantified. When an incident radiation interacts with radiation sensitive element 110 in a CMOS imager, charge carriers are liberated and can be collected for sensing. The number of carriers generated in pixel 100 is proportional to the amount of the incident light impinging on the radiation sensitive element and the sensitivity of radiation sensitive element to light. The electronic signal generated by pixel 100 in a CMOS imager is then read directly on an x-y coordinate system.

FIG. 2 is an illustration of a schematic circuit diagram of an active pixel 200 of a conventional CMOS image sensor with a photodiode 220 as a radiation-sensitive element. Photodiode 220 comprises of a p-n junction diode, wherein the p-doped junction side 210 is connected to a negative bias voltage $V_{sub}$ at 296. The n-doped junction side 230a is connected via connection 230 to drain terminal 230c of reset transistor 240 and to gate terminal 230b of a charge sensing transistor 260. Source terminal 270 of reset transistor 240 is biased to a positive reference bias voltage $V_{REF}$ at 292. Gate terminal 242 of reset transistor 240 is connected to a common row reset line 250.

Source terminal 255 of sense transistor 260 is connected to reference bias voltage $V_{DD}$ at 294. The drain terminal of sense transistor 260, and the source terminal of row select transistor 280 are connected to each other at 265. Row select transistor 280 has its gate terminal 282 connected to a row select signal line 285, and its drain terminal 290 connected to a signal line at 298. Identical pixels represented by active elements 220, 240, 260, and 280 are laid out in the form of a matrix pattern comprising of rows and columns to form the CMOS image sensor array.

FIG. 3 is an illustration of a schematic circuit diagram of an active pixel of a conventional CMOS image sensor operating under ultra-low illumination (e.g., taking photograph from outer space or at night without any flash light). The radiation-sensitive element is a sense element 305 comprising a p-n junction, wherein the p-doped junction side 310 is exposed to low optical radiation 315 and the n-doped junction side 330a is connected via connection 330 to drain terminal 330c of reset transistor 340 and to gate terminal 330b of a charge sensing transistor 370. Source terminal 360 of reset transistor 340, and source terminal 365 of a charge sensing transistor 370 is biased to a positive reference bias voltage $V_{DD}$ at 301. Gate terminal 355 of reset transistor 340 is connected to a common row reset line at 350. A row select transistor 380 has its gate terminal 382 connected to a row select signal line 385, and its drain terminal 387 connected to a column signal bus 390.

When p-doped junction side 310 of sense element 305 is exposed to the optical radiation of low illumination 315, the p-doped junction side 310 releases electrons 320. The released electrons 320 flow towards the n-doped junction side 330a of sense element 305. The number of electrons which are released and flow depend upon the intensity of the optical radiation 315, and the sensitivity of p-dope junction side 310 to the optical radiation. This process of conduction can be compared to a p-n junction diode or to a photodiode.

The charge from n-doped side 330a flows to gate terminal 330b of sensing transistor 370. The positive voltage at gate terminal 330b makes sensing transistor 370 conduct a reference bias voltage $V_{DD}$ 301. When sensing transistor 370 is selected to conduct, the charges are passed to source terminal 375 of row select transistor 380. The row select line 385 has a positive voltage when a particular row is selected to sense. When row select line 385 has a positive voltage, gate terminal 382 of row select transistor 380 is turned "on" to make row select transistor 380 conductive. When row select transistor 380 is selected to conduct, the charges from source terminal 375 are passed on to drain terminal 387 of row select transistor 380, and finally is read-out by column bus line 390.

By applying a positive reset voltage to the row reset line 350, all the sense elements 305 in that row are reverse biased to the reference bias voltage $V_{DD}$ 301. When the reset voltage is removed while all sense elements 305 are exposed to an optical radiation, the charge stored in the sense elements 305 in the respective row decreases due to the induced leakage (photo) current generated by the photo-induced electron-hole pair causing the voltage at gate 330b of the charge sensing transistor 370 to decrease proportionately. By applying a row select voltage to gate 382 of row select transistor 380, a signal representing the voltage at gate 330*b* (and therefore also the charge stored in SENSE element 305) can be read out column-wise via signal lines 390 connected to drain terminal 387 of each row select transistor 380 in a respective column.

After processing the signals from all the active pixels in a CMOS imager array, the final image is reproduced in a digital form. FIG. 4 is an illustration of a CMOS imager capturing a image under ultra-low illumination. Image 401 is captured using CMOS imager 402 under low illumination or low intensity of light, especially when capturing images from space or places were there is no resource of providing a flash light over the object to capture good quality image.

CMOS imager 402 converts the optical radiation exposed on it into electrical signals and processes it to produce digital image 403. The digital image 403 is not an exact replication of the actual image 401. The digital image 403 does not have the exact range of illumination which is present in the original image 401. The digital image produced by a CMOS imager is dull or dark, and with very low intra-scene contrast. A CMOS imager is unable to capture any image under low illumination with high dynamic range and high intra-scene contrast.

Characteristic Analysis of a CMOS Imager:

A CMOS imager experiences some unwanted electrical signals which interfere with the image being read and transferred. These unwanted electrical signals which interfere with a CMOS imager are called "read noise" or "temporal noise". Read noise occurs randomly and is generated by the basic noise characteristics of electronic components in a CMOS imager circuit. This type of noise can be compared to a disturbance like the "snow" in a bad TV reception.

To capture an image using a CMOS imager with high intra-scene contrast and wide dynamic rage under ultra-low illumination, the noise level should be low and the full-well value must be high with high quantum efficiency. The full-well value defines the maximum amount of charge (photons) an individual pixel can hold before saturating. Low noise is achieved with photogate CMOS active pixel sensor (APS), but at the cost of greater reduced quantum efficiency and reduction in full-well.

Low noise can be also achieved with pinned-photodiode (PPD) APS, but PPD APS has very low full-well and a poor quantum efficiency. Furthermore, it requires complicated processing and has great difficulty operating under an advanced (deep sub-micron) process. Photodiode APS is most suited for advance sub-micron process, however, photodiode APS has noise value high when achieving a high full-well, which is not suited for high quality imaging.

In order to capture scenes with high intra-scene contrast under a low-illumination with large range of illumination in the final image, the signal-to-ratio at low-light level of a CMOS imager has to be maximized along with the increase in the saturation signal level value of the CMOS imager. The signal-to-ratio at low-light level (SNR) is governed by the following equation:

$$SNR = (QE/R_N) \qquad (1)$$

where QE is the quantum efficiency and $R_N$ is the read noise. The quantum efficiency, QE, is defined as the ratio between the number of generated electrons and the number of impinging photons and the read noise, $R_N$, is obtained by the root mean square (RMS) value of consecutive samples of the output voltage for one pixel. Thus, to achieve high quality imaging at low-light-level, quantum efficiency (QE) has to be increased simultaneously with a reduction in read noise ($R_N$).

On the other hand, to achieve imaging with high intra-scene contracts, the saturation signal level(full-well) value of the CMOS imager has to be increased. Currently, photodiode-type CMOS imager do not allow this. For a typical CMOS imager, the read noise level $R_N$ remains high between 25 and 70 electrons, and the full-well value only about 70,000 electrons at a very moderate low read noise level of 25 electrons. However, the full-well can be increased to 1,000,000 electrons, but this would increased the noise to about 100 electrons. The increased value of noise when full-well is increased is unacceptable to achieve high quality imaging. The main reason for the increase in noise is that photodiode active pixel read noise is governed by the sense node reset noise. Sense node reset noise can be expressed by the following equation:

$$Q_{noise} = sqrt(kTC_D) \qquad (2)$$

where $Q_{noise}$ is the uncertainty on the charge stored on the capacitor, k is Boltzman's Constant, T is the absolute temperature and $C_D$ is the sense node capacitance value. Thus, to achieve a low noise level, $C_D$ value should be low. But reducing the value of $C_D$ to a lower level would reduce the full-well value.

Hence reducing read noise by reducing $C_D$ is a conflict with achieving large full-well which demands a large $C_D$ value. This conflicting requirement on the sense node capacitance size $C_D$ is one of the main limitations of a CMOS imager in simultaneously achieving large full well and low capacitance. All the above discussed technical limitations make a CMOS imager impossible to achieve high intra-scene contrast under a low-illumination with a large range of illumination in the final image.

SUMMARY OF THE INVENTION

The present invention provides a CMOS imager with a column feedback soft-reset scheme, by which a CMOS imager generates a sub-kTC noise so that read noise does not depend on the sense node capacitance. By using a column feedback circuit, reset noise can be suppressed to a negligible amount, so that a CMOS imager circuit can achieve noise performance to very efficient low noise level. This scheme allows increasing sense node capacitance without an associated noise penalty to it. This scheme provides a method to achieve a large full-well value without sacrificing read-noise performance. The feedback circuit is located at the column side of the circuit which provides a design with a minimal change to the pixel, as a result quantum efficiency or pixel size is not compromised. The present invention allows a CMOS imager to capture image with high intra-scene contracts and with high dynamic range under low illumination.

BRIEF DESCRIPTION OF THE DRAWING

FIG. 4 is an illustration of a flow diagram of a CMOS imager capturing image under ultra-low illumination.

FIG. 6 is an illustration of a flow diagram of a CMOS imager with column feedback soft-reset scheme capturing image under ultra-low illumination.

DETAILED DESCRIPTION OF THE INVENTION

The present invention is a design of a photodiode CMOS imager with a column feedback soft-reset for imaging under ultra-low illumination and with high dynamic range. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

The present invention incorporates a column feedback circuit which provides a scheme for imaging under ultra low illumination and with high dynamic range. The present invention provides a CMOS imager to capture scenes with high intra-scene contrast under a low-illumination with large range of illumination. This pattern as well as the individual active element are generated by a CMOS manufacturing process techniques.

Figure 5:
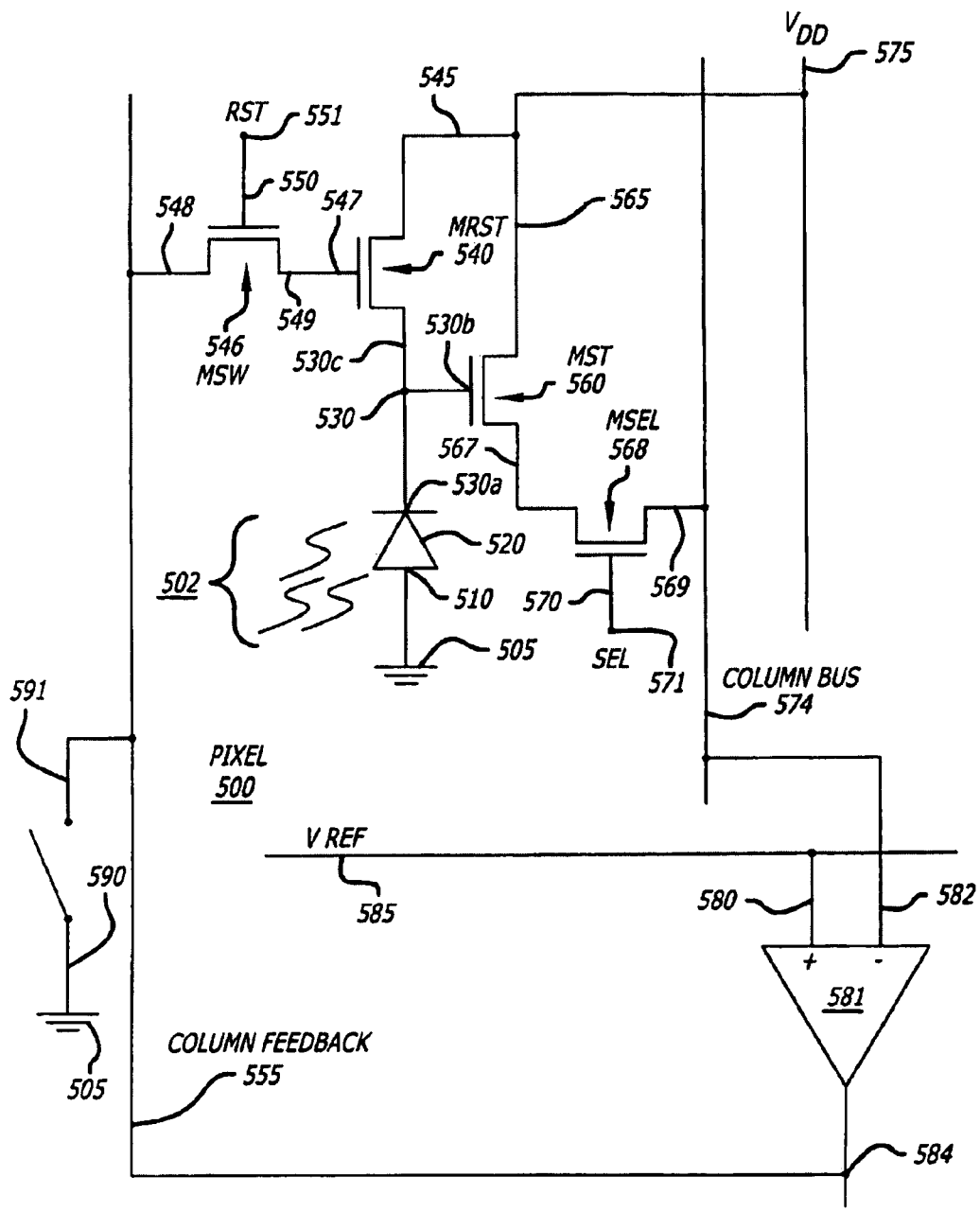
FIG. 5 is an illustration of circuit diagram of one of the embodiment of the present invention.

FIG. 5 is an illustration of a schematic circuit diagram of one of the embodiments of the present invention having an active pixel of a CMOS image sensor with column feedback soft-reset operating under ultra-low illumination. The radiation-sensitive element in active pixel 500 is a photodiode 520 comprising a p-n junction wherein the p-doped junction side 510 is connected to a negative bias voltage $V_{sub}$ at 505. The n-doped junction side 530a is connected via 530 to the drain terminal 530c of reset transistor Mrst 540 and to the gate terminal 530b of a charge sensing transistor Mst 560. The source terminal 545 of reset transistor Mrst 540 and the source terminal 565 of a charge sensing transistor Mst 560 is biased to a positive reference bias voltage $V_{DD}$ at 575.

Gate terminal 547 of reset transistor Mrst 540 is connected to the drain terminal 549 of a soft reset transistor Msw 546. Gate terminal 550 of a soft reset transistor Msw 546 is connected to the common row reset line at 551. The drain terminal of charge sensing transistor Mst 560 is connected to the source terminal of a row select transistor Msel 568 at 567. A row select transistor Msel 568 has its gate terminal 570 connected to a row select signal line 571, and its drain terminal 569 connected to a column signal bus 574.

The feedback circuit has an operational amplifier (e.g. comparator) 581 which has a reference bus voltage line $V_{ref}$ 585 connected to its positive input terminal (non-inverting terminal) 580, and column signal bus line 574 is connected to its negative input terminal (inverting terminal) 582. A comparator is a circuit which compares a signal voltage applied at one input of an operational amplifier with a known reference voltage at the other input. Comparator 581 detects the presence in the signal in column bus line 574 and changes its output with reference to the voltage in the reference bus voltage line $V_{ref}$.

Output terminal 584 of operational amplifier 581 is connected to the feedback bus line 555. An amplifier of large gain is used as an operational amplifier (comparator 581). The feedback bus 555 has a two-pole switch 590 connected to it. One terminal of the switch 590 is biased to ground 505 and the other terminal 591 is connected to the feedback bus 555. The switch provides a scheme for manual reset of a pixel.

Pixel 500 consists of three conventional transistors (Filed Effect Transistors or FETs), viz., Mrst 540, Mst 560, and Msel 568. Unlike a conventional pixel, the present invention has an additional transistor Msw 546, an operational amplifier 581, and an additional line (a feedback bus line 555) for providing the feedback to pixel 500. The column feedback line is connected to the source terminal 548 of the soft reset transistor Msw 546. When the reset signal 551 is at high level, the soft reset transistor Msw 546 conducts the feedback signal. When the reset signal 551 is at low level, the soft reset transistor Msw 546 does not conduct the feedback signal. The power bus ($V_{DD}$) 575 is pulsed signal providing imaging with zero-lag.

Photodiode 520 in a CMOS imager is exposed to optical radiation 502 generating a charge flow in the photodiode. The generated charges flow from n-doped side 530a to gate terminal 530b of sensing transistor 560. The positive voltage at gate terminal 530b makes sensing transistor 560 to conduct a reference bias voltage $V_{DD}$ 575. When sensing transistor 560 conducts, the charges are passed to source terminal 567 of row select transistor 568. The row select line 571 has a positive voltage when a particular row is selected to sense. When a row select line 571 has a positive voltage, the gate terminal 570 of row select transistor 568 is turned "on" to make row select transistor 568 conductive. When row select transistor 568 conducts, the charges from the source terminal 567 are passed on to the drain terminal 569 of row select transistor 568, and is finally read-out by the column bus line 574.

Column feedback operational amplifier 581 has an inverting terminal 582, and a non-inverting terminal 580. Both terminals are connected to column bus line 574 and reference bus voltage line 585, respectively. The output of an operational amplifier is fed back to the source terminal 548 of soft reset transistor 546. By applying a positive reset voltage to gate terminal 550 from row reset line 551 makes the soft-reset transistor 546 conduct the feed-back voltage from the column feedback line 555.

When soft reset transistor 546 conducts, it passes a voltage to gate terminal 547 of reset transistor 540. Reset transistor 540 conducts a positive reference bias voltage $V_{DD}$ 575 when the gate terminal 547 is high (i.e., has a positive voltage). The scheme of achieving the conduction of the reset transistor 540 is called "soft-reset". This process eliminates the noise associated with the capacitance of the pixel circuit. An in-depth analysis of various electrical properties of one of the embodiments of the present invention is discussed below.

Figure 1:
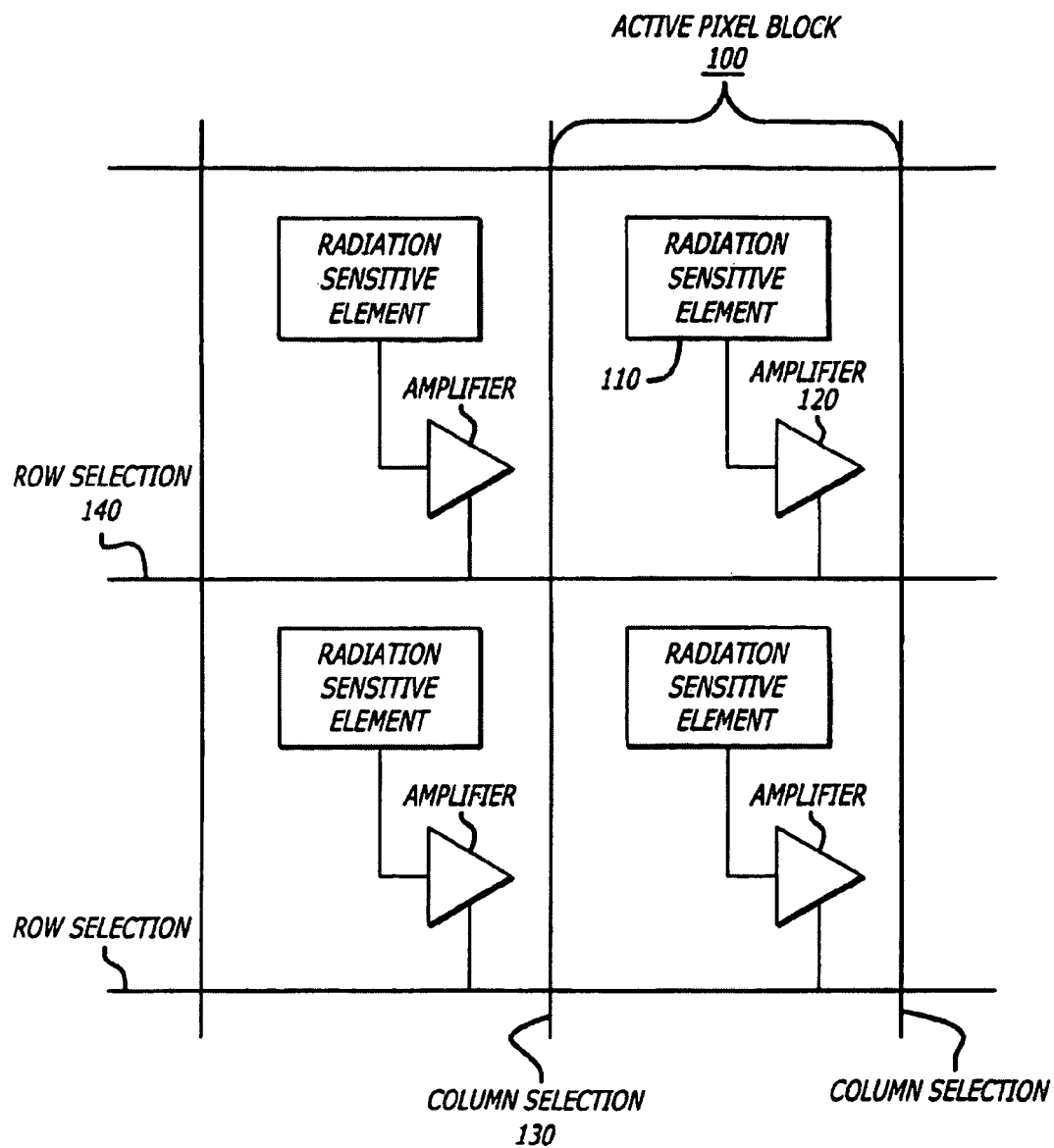
FIG. 1 illustrates a CMOS imager array.
Figure 2:
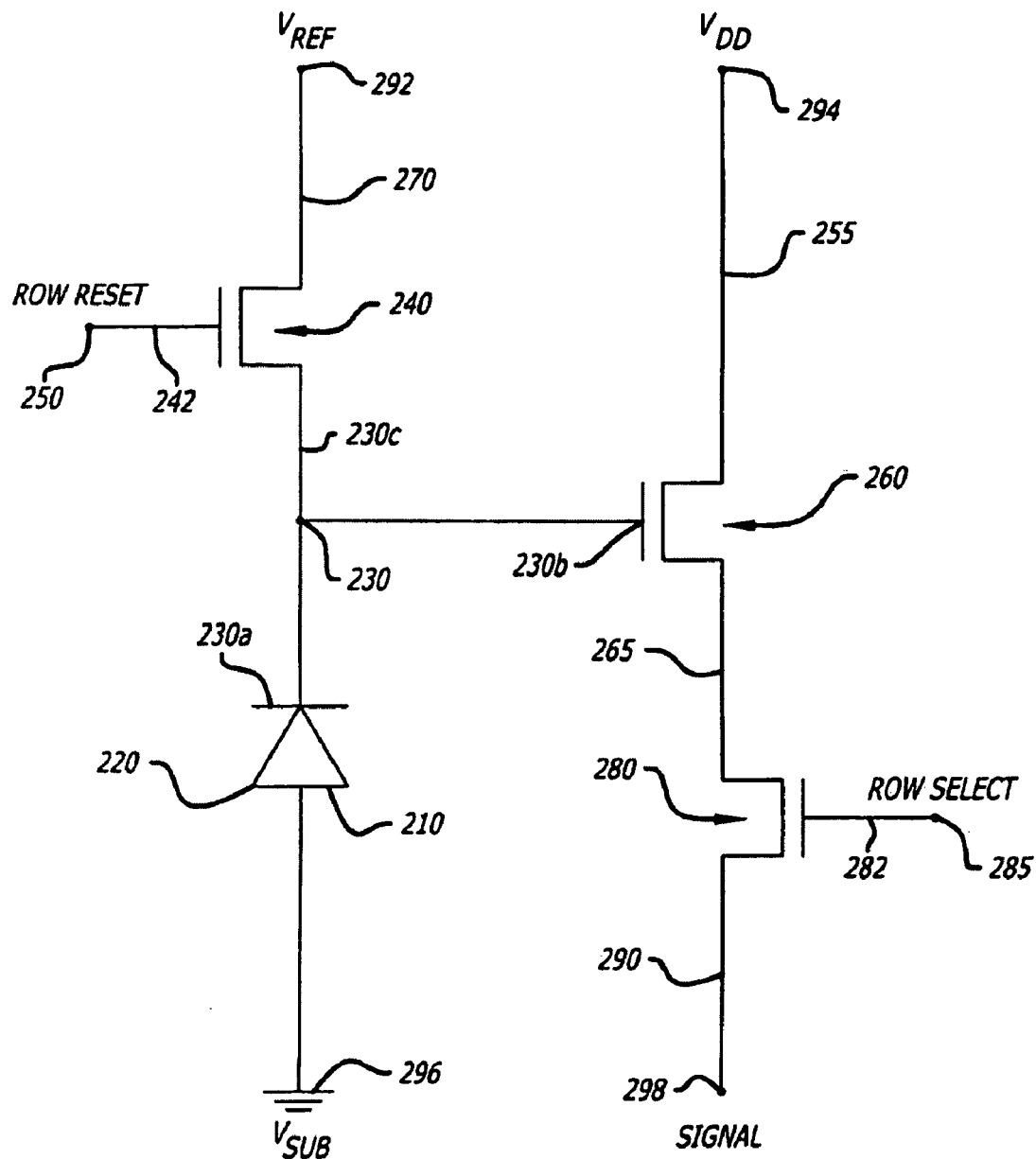
FIG. 2 is an illustration of a schematic circuit diagram of a pixel of a conventional CMOS image sensor with a photodiode as a radiation-sensitive element.
Figure 3:
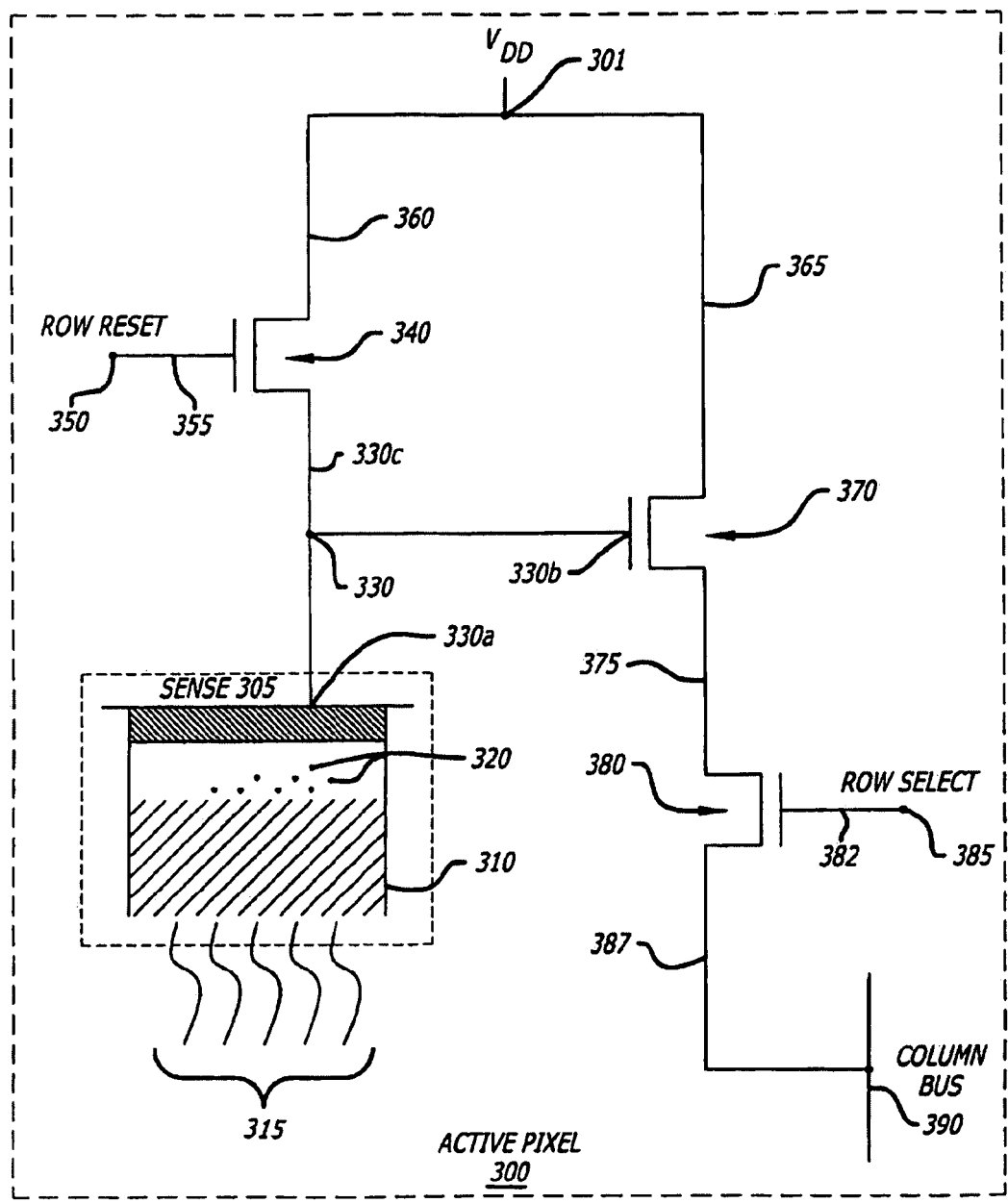
FIG. 3 is an illustration of a schematic circuit diagram of an active pixel of a conventional CMOS image sensor operating under ultra-low illumination.

Low-Noise Photodiode Pixel Using Column-Feedback Reset:

FIG. 3 shows the pixel schematic of a conventional photodiode active pixel sensor (APS). Noise in photodiode-type CMOS APS is primarily due to the reset noise (kTC) present at node 330a, which is also called a "sense node" (in FIG. 5, the sense node is 530a). A signal integrated on a photodiode sense node is calculated by measuring difference between the voltage on the column bus 390 before and after the row reset 350 is pulsed. Uncertainty in the number of electrons at the sense node following a reset generates a reset noise (N). The reset noise is governed by the following equation:

$$N^2 = \frac{kTC_{SENSE}}{q^2} \tag{3}$$

Where "$C_{SENSE}$" is the sense node capacitance, "q" is the electronic charge, "k" is the Boltzmann constant and "T" is the temperature in degree Kelvin.

A noise value lower than kTC can be achieved with a photodiode-type pixel employing a "soft-reset" technique.

Soft reset refers to resetting with both drain and gate of the n-channel reset transistor kept at the same potential. It is also obtained if both $V_{DD}$ 575 and the RST 551 are kept at the maximum permitted voltage for a given CMOS technology (e.g. 3.3V using a 0.35 µm technology). Under such conditions, the sense node can charge to approximately $V_{DD}$-$V_T$, where $V_T$ is the threshold voltage. In fact, as long as reset line voltage 551 remains high, the sense node continues to charge up under sub-threshold Metal Oxide Semiconductor Field Effect Transistor (MOSFET) current flow causing the node to rise in a logarithmic fashion.

The current flow in the rest FET during "Soft-reset":

$$I = \exp\left[\frac{q \cdot (Vrst - Vsense - Vm)}{mkT}\right] = \exp[\beta(Vrst - Vsense)] \quad (4)$$

$$\text{where } \beta = \left[\frac{q}{mkT}\right] \quad (5)$$

By implementation of the present invention, sub-kTC reset noise can be achieved under soft-reset. As long as the sense node swing is large enough ($\beta\Delta q \gg 1$), noise at the sense is governed by the following equation:

$$N^2 = \left[\frac{Csense}{2\beta}\right] \quad \text{when } \beta \cdot \Delta q \gg 1 \quad (6)$$

Thus, if the feedback factor ($\beta$) can be made large, read noise can be made very small. Union conventional soft-reset $\beta$ is relatively small, since the minimum value for the non-ideality factor (m) is approximately equal to 1. Hence, only about a factor of 2 reduction in reset noise is possible.

Feedback factor $\beta$ can be increased by using circuit feedback. FIG. 5 shows the schematic of a photodiode pixel that suppresses the reset noise arbitrarily beyond the conventional kTC value. The reset noise suppression is achieved by resetting pixel 500 in soft-reset with the reset level determined by column-feedback 555.

The feedback is provided by the column-feedback amplifier 581 by minimizing the error between the voltage on the column bus 574, and the reference-bus $V_{ref}$ 585. The reference bus has a fixed D.C. level and is common to all columns in an APS array. Under feedback, the gate of Mrst 540 is continuously adjusted so that the pixel output reaches the voltage level set by $V_{ref}$ 585, and the pixel is reset under "soft-reset". As the gain of column amplifier 581 is large, the feedback factor $\beta f$ during "soft-reset" can be arbitrarily high and provides reset noise suppression.

The feedback factor for the circuit can be determined by the following current equation:

$$I = I_o \cdot \exp[\beta(Vrst-Vsense)] = I_o \cdot \exp[-(1+A) \cdot \beta \cdot Vsense] = I_o \cdot \exp[\beta f \cdot Vsense] \quad (7)$$

where $\beta f = (1+A)\beta$, and A is the gain of column amplifier 581. From equation (1), it can be seen that using a column-feedback, the reset noise is reduced to:

$$N^2 = \left[\frac{Csense}{2\beta \cdot (1+A)}\right] \quad \text{for } \beta \cdot \Delta q \gg 1 \quad (8)$$

Thus, through an appropriate choice of column-amplifier gain A, reset noise can be suppressed to a negligible amount. By using column-amplifier 581 with a gain of 100 reduces the noise by a factor of 10, which is more that sufficient for low-noise applications. The noise from the column-amplifier can also be made negligible by increasing the feedback bus capacitance.

Furthermore, low-noise no longer requires small sense node capacitance(Csense), since the same noise value can be achieved by keeping the ratio of Csense to amplifier gain (A) constant. This is extremely important, since large full-well requires large sense node capacitance. Thus, the scheme presented here simultaneously achieves low noise and large full-well, and hence removes a critical limitation of CMOS photodiode APS performance.

High gain amplifiers usually require complicated circuits for implementation, and as such, cannot be integrated in a small pixel. However, in the scheme presented here, the high gain amplifier is at the bottom of the column. Only one additional transistor (typically a FET) and an additional line is needed in the pixel. As a result, reset noise is suppressed without sacrificing pixel fill-factor and quantum efficiency or pixel size. Thus, the noise suppression scheme is entirely compatible with realistic and advanced imager design. The present invention provides a scheme which simultaneously supports high QE, low noise, small pixel size, and large full-well, enabling high performance imaging in CMOS technology.

FIG. 6 is an illustration of a process of the present invention which provides a CMOS imager 602 with a soft-reset scheme by which a CMOS imager generates a sub-kTC noise so that read noise does not depend on the sense node capacitance. By using a column feedback circuit, reset noise can be suppressed to a negligible amount so that photogate APS or CCD-like circuits can achieve noise performance to a very efficient value (low noise level). This scheme allows increasing sense node capacitance without any associated noise penalty to it. This scheme provides a method to achieve a large full-well value without sacrificing read-noise performance. As a result the original image 601 is captured under low illumination to a digital image form 603 with very high intra-scene contract and high dynamic range.

The feedback circuit in one of the embodiments of the present invention is located at the column side of the circuit. In FIG. 5, an operational amplifier 581, and a soft reset transistor 546 are located outside a pixel 500. The design in which the feedback circuit is placed, according to one of the embodiments of the present invention, provides a scheme to implement a CMOS imager with a column feedback soft-reset circuit without any change in the pixel area. This design makes it all the more practical for manufacturing a CMOS device without complicating the pixel design. As the feedback circuit does not need a change in pixel area or interfere with the pixel area, a pixel of a greater quantum efficiency is produced using existing pixel designs. A CMOS imager with column feedback soft-reset circuit yields larger full-well and greater quantum efficiency with no compromise in pixel area.

In the present invention, a photodiode CMOS imager with column feedback provides low-noise, high QE, and high full-well imaging. By employing the present invention, a CMOS imager can achieve read noise reduced down to less than 5 electrons and provides an excellent low-light-detection. A full-well can be also achieved as large as 1 million electrons providing a dynamic range of over a 105 dB, and increasing quantum efficiency as high as about 60%, which results in a higher performance image.

Other Designs

Figure 7:
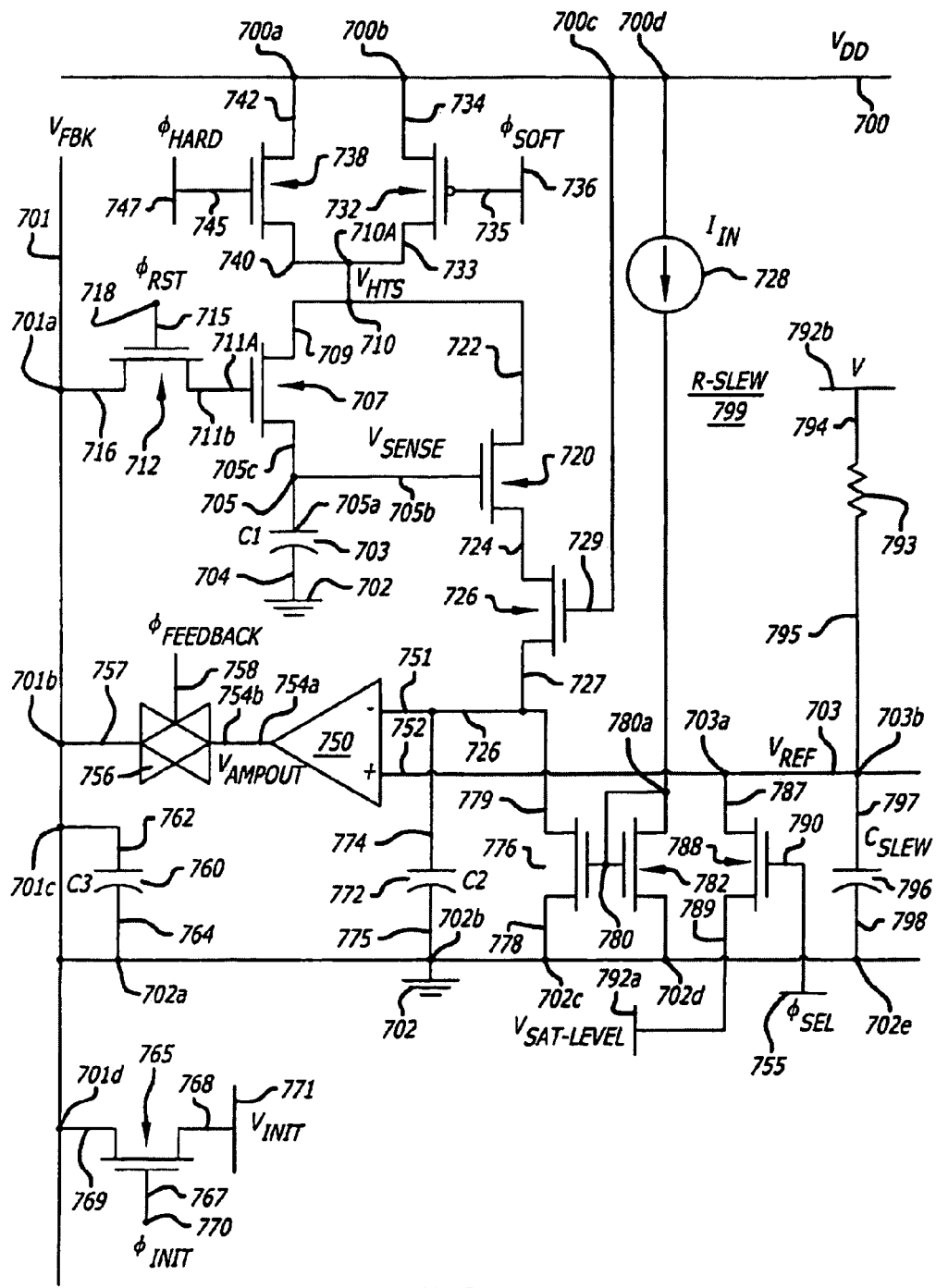
FIG. 7 is an illustration of circuit diagram of one of the embodiment of the present invention with a R-C Slew circuit.

One of the embodiments of the present invention has a R-C circuit in addition to a feed back amplifier and soft-reset. FIG. 7 is an illustration of a schematic diagram of one of the embodiments of the present invention with column-feedback and R-C circuit providing a ramp for the reference level bus.

The radiation-sensitive element in an active pixel is a photo capacitor 703. Photo capacitor 703 has one end 704 connected to a negative bias voltage $V_{sub}$ (ground voltage) at 702 and the other end 705a is connected via 705 to drain terminal 705c of a reset transistor Mrst 707, and to gate terminal 705b of a charge sensing transistor Mst 720.

The source terminal 709 of reset transistor Mrst 707, and the source terminal 722 of charge sensing transistor Mst 720 is biased to a positive reference bias voltage $V_{hts}$ 710. The $V_{hts}$, 710 depends on the selection of "hard" or "soft" transistors. A transistor which is responsible for a "hard" picture quality is N-MOS transistor 738, and a transistor which is responsible for a "soft" picture quality is P-MOS transistor 732.

Gate terminal 745 of "hard" N-MOS transistor 738 is connected to "hard" signal line 747. The gate terminal 735 of a "soft" P-MOS transistor 732 is connected to a "soft" signal line 736. The source terminals of both N-MOS transistor 738 and P-MOS transistor 732 are connected to a reference bias voltage power bus ($V_{DD}$700) at 700a and 700b respectively. The drain terminal 740 of N-MOS transistor 738 and the drain terminal 733 of P-MOS transistor 732 are connected together at node 710a. The node 710a is connected to 710.

N-MOS transistor 738 conducts when the signal value in "hard" signal line 747 is at a high level (e.g., a positive voltage value). When the N-MOS transistor 747 conducts a reference bias voltage $V_{DD}$ 700 a positive voltage value is passed to the node 710a via the drain terminal 740. The P-MOS transistor 732 conducts when the signal value in "soft" signal line 736 is at a low level (e.g., a zero voltage value). When the P-MOS transistor 732 conducts a reference bias voltage $V_{DD}$ 700 a positive voltage value is passed to the 710a via the drain terminal 733. The voltage at nodes 710a and 710 is $V_{hts}$, which depends upon selection of the signal at the gate terminal of N-MOS transistor 738 and P-MOS transistor 732.

Gate terminal 711a of the reset transistor Mrst 707 is connected to the drain terminal 711b of a soft reset transistor Msw 712. The gate terminal 715 of a soft reset transistor Msw 712 is connected to the common row reset line at 718. The drain terminal of a charge sensing transistor Mst 720 is connected to the source terminal of a row select transistor Msel 726 at 724. A row select transistor Msel 726 has its gate terminal 729 connected to a reference bias voltage $V_{DD}$ 700 at 700c, and its drain terminal 727 connected to a column signal bus 728.

Load transistor 776 is connected to the column signal bus 728. A current supply source 728 provides the gate terminal 780 of a load transistor 776 a positive pulse for conduction. The source terminal 779 is connected to the column signal bus 728. The transistor 776 serves as a load to an active pixel. A capacitor C2 772 is connected between the inverting terminal 751 of an operational amplifier 750 and to a negative bias voltage (ground) at 702b. The capacitor 772 charges when there is a positive signal in the column bus line 728 and discharges when there is no signal in the column bus line 728. By controlling the capacitance value of the capacitor C2 772, the noise level is reduced along with a higher full-well feed back.

The feedback circuit has an operational amplifier 750 which has a reference bus voltage line $V_{ref}$703 connected to its positive input terminal (non-inverting terminal 752), and column signal bus line 728 connected to its negative input terminal (inverting terminal 751). The output terminal 754a of an operational amplifier 750 is connected to a pass transistor 756. A pass transistor 756 has the output of the operational amplifier 750 and a feedback pulse is supplied to the input terminals at 754a and 755 respectively. The output signal of a pass transistor is a product of the two inputs. Hence, the pass transistor output will have a positive signal only when both the feedback pulse 755, and the operational amplifier 754a are positive signals.

A "resistance-capacitance slew circuit" is provided as a reference voltage source. A resistance-capacitance slew circuit provides a reference bias voltage which slowly increases to a saturation point and falls back to a zero or a low voltage level. The time rate at which it increases (also known as ramp up) is slower than the feedback closed-loop response time in an embodiment of the present invention. A reset transistor 707 is maintained to conduct in closed loop feedback during the entire process providing a further reduction in noise. Without the ramp on the reference voltage such closed loop feedback is not maintained.

Resistance 793 is connected to a positive voltage source 792b at 794 and to a non inverting terminal 752 via 703b. Capacitor 796 is connected between the resistance 793 at 703b and a negative bias voltage 702 at 702e. A positive voltage source 792b generates a pulse signal. The capacitor 796 charges when the voltage at 792b is at a positive voltage level and discharges when the voltage at 792b is zero.

N-MOS transistor 788 is connected to the voltage reference bus line 703 at 703a and acts as a switch to provide a by-pass path for the current discharge of the capacitor 796. A N-MOS transistor 788 conducts when a positive signal is supplied at the gate terminal 790 from a pulse line 755. When the N-MOS transistor 788 conducts, it provides a low resistance path for the R-Slew circuit 799. As current always flows through a low resistance path, the charges are not passed to the feedback amplifier 750.

A pixel consists of three conventional transistors (FETs), viz., Mrst 707, Mst 720, and Msel 726. One embodiment of the present invention has an additional transistor Msw 712, a operational amplifier 750, a R-C Slew circuit, contrast control transistors (738 & 732), pass transistor 756, bias transistors (776, 782, 788 and 765), and an additional feedback bus line 701. The signal in power bus $V_{DD}$ 700 is pulsed, which provides imaging with zero-lag.

Figure 8:
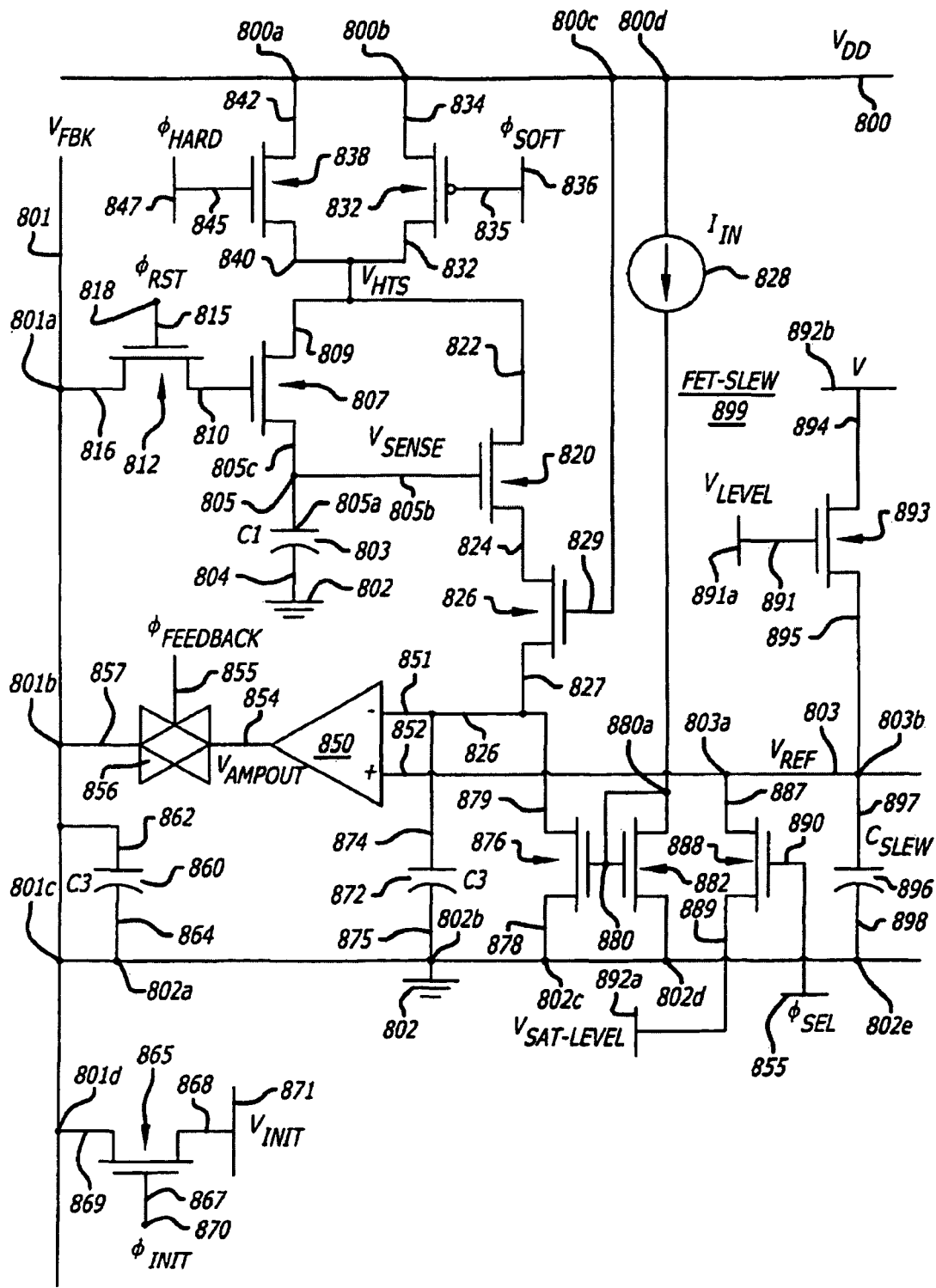
FIG. 8 is an illustration of circuit diagram of one of the embodiment of the present invention with a FET Slew circuit.

FIG. 8 is an illustration of one of the embodiments of the present invention with a FET providing the ramp scheme. The ramp circuit consist of a N-MOS transistor 893 and a capacitor 896. The source terminal 894 of a N-MOS transistor 893 is connected to a voltage source 892b. The drain terminal 895 of a N-MOS transistor 893 is connected to a capacitor 896 via voltage reference bus at 803b. The other input terminal 898 of the capacitor 896 is connected to a negative bias voltage 802 at 802e.

Gate terminal 891 of a N-MOS transistor 893 is connected to a voltage source 891a. When the signal at gate terminal 891 is high (positive value) the capacitor 896 gets charged. When the voltage at 803b is at a zero voltage level, it gets discharged. The time rate of increase of the signal generated in capacitor 896 is slower than the feedback closed-loop response time, according to one of the embodiments of the present invention.

A reset transistor 807 is maintained in a closed loop feedback during the entire process providing a further reduction in noise. Without the ramp on the reference voltage, such closed loop feedback is not maintained.

Thus, a method and apparatus for a photodiode CMOS imager with column feedback soft-reset for imaging under ultra-low illumination and with high dynamic range is described in conjunction with one or more specific embodiments. Although the present invention has been described in considerable detail with regard to the preferred versions thereof, other versions are possible. The invention is defined by the claims and their full scope of equivalents.

We claim:

1. A method for capturing images under ultra-low illumination with high dynamic range comprising:
   capturing radiation by a pixel of an imager;
   providing a column feedback circuit having a soft reset transistor, a reset transistor, a column bus and a comparator, wherein,
      said column bus is coupled directly to a negative input of said comparator,
      an output of said comparator is coupled directly to a source of said soft reset transistor,
      a gate of said soft reset transistor is coupled directly to a reset signal, and
      a drain of said soft reset transistor is coupled directly to a gate of said reset transistor;
   said column feedback circuit soft-resetting a pixel whenever said reset signal is at a high level.

2. The method of claim 1, wherein said capturing radiation uses a pixel of an imager.

3. The method of claim 2, wherein said capturing radiation comprises an imager to convert radiation into electrical signals.

4. The method of claim 3, wherein said electrical signals comprises of a signal with very low noise or no noise at all.

5. The method of claim 2, wherein said imager comprises of a CMOS transistor.

6. The method of claim 2, wherein said imager comprises of a FET transistor.

7. The method of claim 1, wherein said providing comprises of using a feedback scheme.

8. The method of claim 7, wherein said feedback scheme comprises using an amplifier.

9. The method of claim 8, wherein said amplifier is an operational amplifier.

10. The method of claim 8, wherein said amplifier is of high gain.

11. The method of claim 1, wherein said soft-resetting a pixel comprises of a transistor.

12. The method of claim 11, wherein said transistor is a N-MOS transistor.

* * * * *